(12) United States Patent
Walker

(10) Patent No.: US 6,966,416 B2
(45) Date of Patent: Nov. 22, 2005

(54) CONVEYOR SYSTEM

(75) Inventor: John Graeme Walker, Morpeth (GB)

(73) Assignee: Automation Conveyors, Ltd., Northumberland (GB)

(*) Notice: Subject to any disclaimer, the term of this patent is extended or adjusted under 35 U.S.C. 154(b) by 0 days.

(21) Appl. No.: 10/940,341

(22) Filed: Sep. 14, 2004

(65) Prior Publication Data

US 2005/0063809 A1   Mar. 24, 2005

(30) Foreign Application Priority Data

Sep. 19, 2003   (GB) ................................ 0321989

(51) Int. Cl.[7] ............................................. B65G 13/00
(52) U.S. Cl. ................................ 193/35 A; 193/35 SS; 414/535
(58) Field of Search .................... 193/35 A, 35 SS; 198/345.3, 345.1, 463.4, 530, 621.2; 414/528, 414/486, 531, 535

(56) References Cited

U.S. PATENT DOCUMENTS

| | | | |
|---|---|---|---|
| 4,684,311 A * | 8/1987 | Dickson-Wright et al. .. | 414/535 |
| 4,759,676 A * | 7/1988 | Hammond ................ | 193/35 A |
| 4,966,515 A * | 10/1990 | Van Niekerk ............. | 414/528 |
| 5,350,048 A * | 9/1994 | Wylie ....................... | 193/35 A |
| 5,409,096 A * | 4/1995 | Clopton .................... | 198/460.1 |
| 6,435,328 B1 * | 8/2002 | Hammond ................ | 193/35 A |
| 6,746,199 B2 * | 6/2004 | Carawan et al. ........... | 414/535 |

\* cited by examiner

*Primary Examiner*—James R. Bidwell
(74) *Attorney, Agent, or Firm*—Pearne & Gordon LLP

(57) ABSTRACT

A conveyor system for loading pallets into and out of a vehicle includes an accumulating conveyor and airbag rail. The accumulating conveyor is constituted by a pair of chain rails for supporting and conveying pallets into and out of a vehicle. The airbag rail is positioned between the chain rails and adjacent to one of the chain rails. The airbag rail is constituted by a base beam, a lift beam and an airbag positioned between the two beams. The arrangement is such that, with the chain rails and the base beam fixed to the floor of a vehicle, the airbag can be inflated to raise the lift beam so as to lift an edge portion of a pallet supported by the two chain rails out of contact with one of the chain rails.

8 Claims, 3 Drawing Sheets

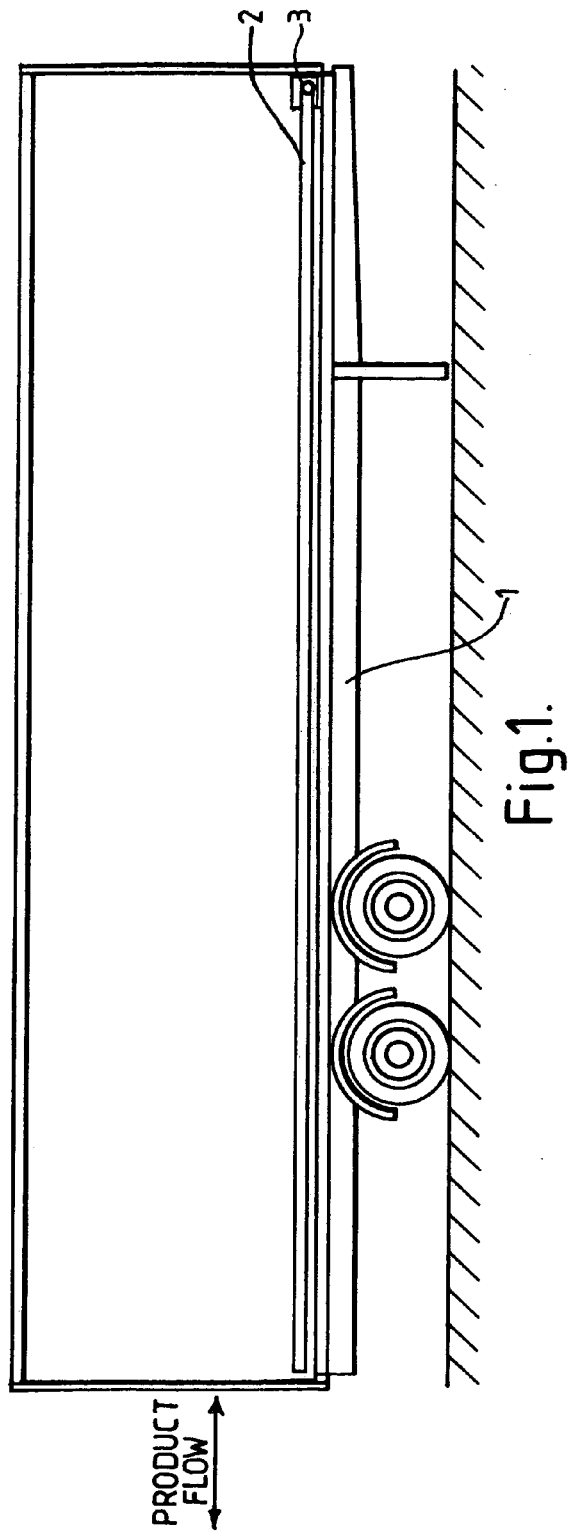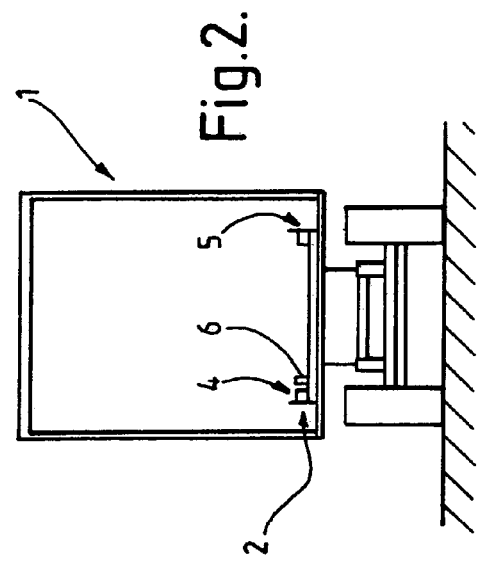

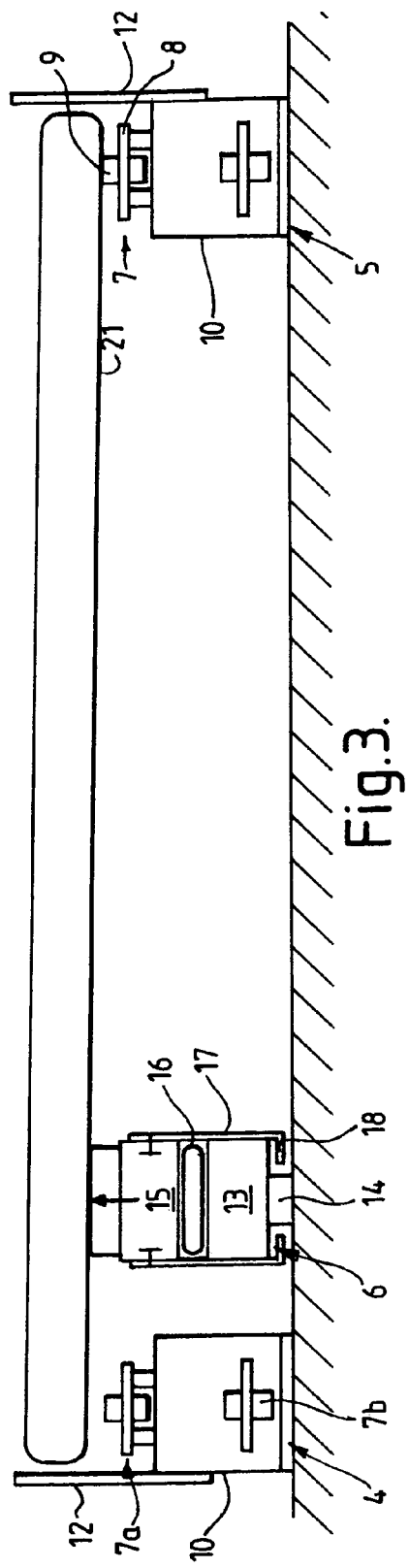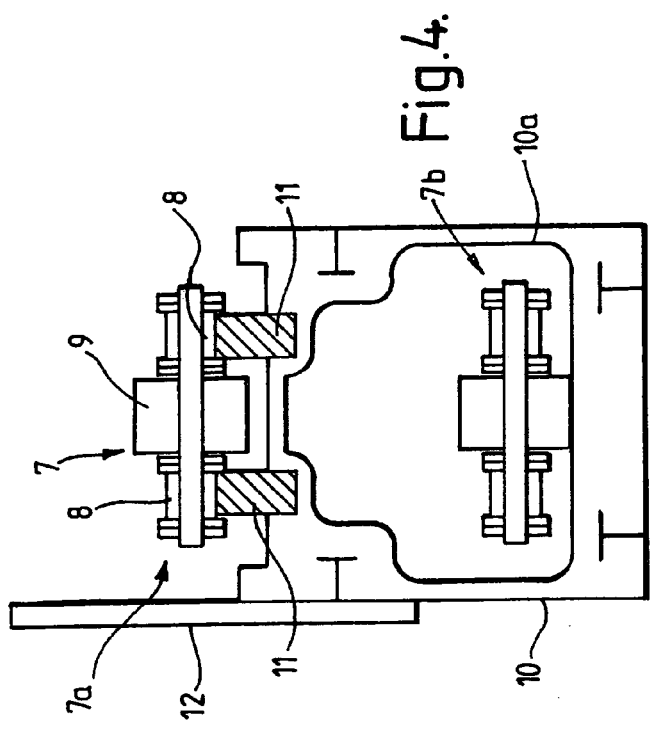

CONVEYOR SYSTEM

BACKGROUND OF THE INVENTION

This invention relates to a conveyor system, and in particular to an accumulating conveyor for use inside a vehicle.

In order to transport large articles such as car seats, it is known to position one or more of the articles on a pallet, and to feed the pallet into a vehicle such as the trailer of an articulated lorry using a conveyor positioned on the floor of the trailer. Typically, an accumulating conveyor is used, so that pallets can be fed into the trailer in succession so that, when a given pallet is fed into the trailer as far as it can travel, that pallet will maintain its position whilst the conveyor continues to feed further pallets into the trailer. Typically, an accumulating conveyor has one or more endless chains, the links of which carry freely-rotatable rollers. In use, a pallet is positioned on the conveyor at the rear of the trailer, and the conveyor chain drive is engaged to carry the pallet into the trailer. When that pallet reaches the front of the trailer, where it is prevented from further movement, the rollers supporting that pallet rotate backwards whilst the chain or chains are driven further forward. Consequently, one or more further pallets can be fed into the trailer from its rear, each of the additional pallets, in turn, being fed into the trailer until it engages with a stationary pallet immediately adjacent thereto towards the front of the trailer. In this way, pallets can continue to be fed into the interior of the trailer by continuously driving the conveyor drive chain or chains, without risk of the pallets or the articles they carry being damaged by collisions therebetween.

A known conveyor system of this type has a central drive chain and a pair of sets of rollers positioned on opposite sides thereof. The central chain is positioned within an elongate recessed portion of the trailer floor, and each of the sets of rollers is similarly positioned in a respective elongate recessed portion of the trailer floor, the three recessed portions extending longitudinally along the floor of the trailer. A respective airbag is positioned on the base of each of the recessed portions, so that the airbags can support the sets of rollers and the drive chain. In use, the airbags are inflated to lift the drive chain and the rollers slightly above the trailer floor. Pallets can then be fed into the trailer by engaging the drive of the chain. As soon as all the pallets are positioned, the airbags are deflated, and the pallets drop down to rest on the floor of the trailer. Frictional contact between the pallets and the trailer floor will subsequently tend to prevent movement of the pallets relative to the floor as the trailer moves, particularly when it accelerates or is braked.

The disadvantage of this known system is that an air supply to the bags is required throughout loading and unloading operations, which means that the tractor unit of the vehicle must be connected to the trailer during loading or unloading, or a separate air supply is required. Another disadvantage of this known system is that, if the products supported by the pallets are light, the frictional force between the pallets and the vehicle floor may be insufficient to stop the pallets moving if the vehicle accelerates or brakes abruptly, or if it travels over a bumpy road.

SUMMARY OF THE INVENTION

The present invention provides a conveyor system for loading pallets into and out of a vehicle, the system comprising an accumulating conveyor and an airbag rail, the accumulating conveyor being constituted by a pair of chain rails for supporting and conveying pallets into and out of a vehicle, the airbag rail being positioned between the chain rails and adjacent to one of the chain rails, wherein the airbag rail is constituted by a base beam, a lift beam and an airbag positioned between the two beams, the arrangement being such that, with the chain rails and the base beam fixed to the floor of a vehicle, the airbag can be inflated to raise the lift beam so as to lift an edge portion of a pallet supported by the two chain rails out of contact with said one chain rail.

Preferably, each chain rail comprises a chain rail housing and an endless conveyor chain, the housing defining an upper surface which supports a working run of the conveyor chain, the interior of the housing surrounding a return run of the conveyor chain.

Advantageously, each conveyor chain has a plurality of links, each of which supports a freely-rotatable roller, and the links of the conveyor chains are provided with wear strips for contact with the upper surface of the associated chain rail housing.

Conveniently, each chain rail housing and the base beam are provided with means for fixing to a vehicle floor.

Preferably, each chain rail housing is provided with an upwardly-projecting flange at that side thereof remote from the other chain rail housing. In this case, the upwardly-projecting flange of the housing of said one chain rail may be provided with an inwardly-extending lip at the upper end thereof.

Advantageously, a layer of high friction material is provided on the upper surface of the lift beam.

BRIEF DESCRIPTION OF THE DRAWINGS

The invention will now be described in greater detail, by way of example, with reference to the drawings, in which:

FIG. 1 is a side view of a trailer containing a conveyor system constructed in accordance with the invention;

FIG. 2 is an end view of the trailer and conveyor of FIG. 1;

FIG. 3 is an end elevation of the conveyor system;

FIG. 4 is an enlarged view of one of the chain rails forming part of the conveyor system;

DESCRIPTION OF PREFERRED EMBODIMENTS

Figure 5:
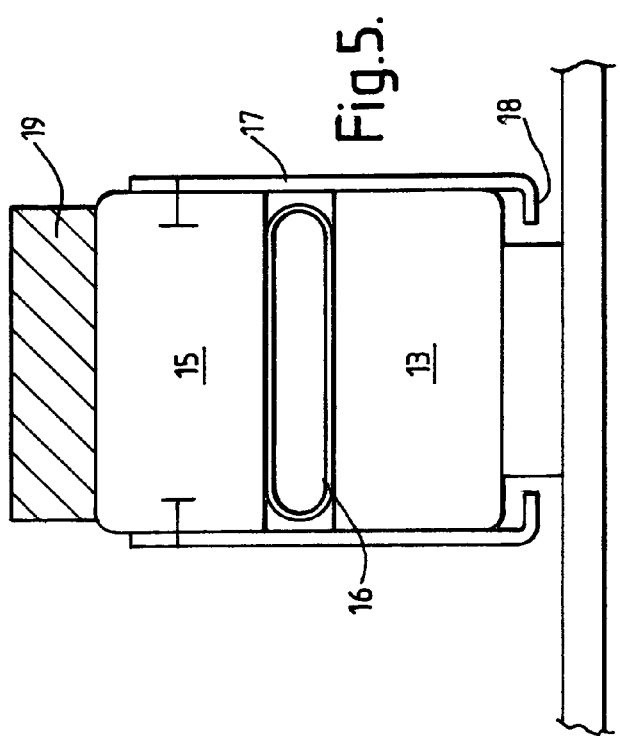
FIG. 5 is an enlarged view showing an airbag rail forming part of the conveyor system.

Referring to the drawings, FIGS. 1 and 2 show a trailer 1 of an articulated lorry, the trailer containing an accumulating conveyor, indicated generally by the reference numeral 2, which is mounted on the floor of the trailer.

The conveyor 2 is provided with a drive drum 3 at its front end (the end adjacent to the front of the trailer 1). As shown in FIG. 3, the conveyor 2 is constituted by a pair of chain rails 4 and 5 and an airbag rail 6. Each of the chain rails 4, 5 is constituted by an endless, three-quarter inch triplex chain 7 whose links 8 each carry a roller 9, the rollers being freely rotatable with respect to their links. The working run 7a of each chain rail 4, 5 is supported above the top surface of a respective chain rail housing 10 by means of chain wear strips 11 made of polyethylene. The return run 7b of each chain rail 4, 5 is housed within a respective aluminium extrusion 10a positioned within the housing 10. The housings 10 are fixed to the floor of the trailer 1. A respective vertical side guide 12 is attached to each of the chain rail housings 10, the side guides being positioned at the extreme lateral edges of the conveyor 2.

The airbag rail 6 (see FIG. 5), which extends the entire length of the conveyor 2, has a base beam 13 fixed to the floor of the trailer 1 by means of a pillar 14. The base beam 13 supports a lift beam 15, an airbag 16 being positioned between the two beams. The lift beam 15 is fixed to a housing 17 which slidably engages the side walls of the base beam 13. The housing 17 is provided with in-turned lips 18 for limiting movement of the lift beam 15 with respect to the base beam 13, in the manner described below. The top surface of the lift beam 15 is provided with a layer 19 made of a material having a high coefficient of friction. The layer 19 can, for example, be made of wood or rubber.

The conveyor 2 is used to move pallets into, and out of, the trailer 1. Thus, pallets are delivered to the conveyor 2 from a land-based conveyor (not shown). This land-based conveyor could be a standard floor mounted conveyor provided in a factory. Such a floor mounted conveyor has a dedicated control system for controlling operation of that conveyor, and this control system can be modified to control the conveyor 2 via an umbilical connection (not shown).

In practice, the trailer 1 will be positioned so that the conveyor 2 is adjacent to, and in alignment with, the delivery end of the floor mounted conveyor. Pallets 21, each of which supports one or more components such as a car seat, are then fed onto the conveyor 2 from the floor mounted conveyor, both conveyors being set in motion using the control system associated with the floor mounted conveyor. As the first pallet 21 reaches the front of the trailer 1, it is halted by engagement with the front of the trailer, and the rollers 9 supporting that pallet rotate backwards as the chains 7 move forwards. Similarly, subsequent pallets 21 come to a halt as their front edges engage the rear edge of the pallet immediately in front. As soon as all the pallets 21 have been loaded onto the conveyor 2, that conveyor is stopped, and the airbag rail 6 is operated by inflating the airbag 16 with air from the vehicle's supply. An air flow control valve (not shown) is controlled, via the umbilical connection, by the control system. Inflation of the airbag 16 raises one edge of each of the pallets 21 away from the chain rail 5, so that the pallets are supported on the layer 19 on the top surface of the lift beam 15, this layer having a sufficiently high coefficient of friction to inhibit pallet movement when the trailer 1 is accelerated, braked or driven over bumpy roads.

When the trailer 1 reaches its destination, the pallets 21 can be unloaded by reversing the loading operations described above. Thus, the rear of the trailer 1 is aligned with a floor mounted conveyor at the destination, the umbilical connection of the floor mounted conveyor is attached to the conveyor 2, air is released from the airbag 16, so that the pallets rest on both chain rails 4 and 5, and the two conveyors are then started, with the chains 7 moving in the opposite direction to that in which they moved during the loading process. The pallets 21 are then fed off the conveyor 2 from the rear of the trailer 1 and onto the floor mounted conveyor.

Figure 6:
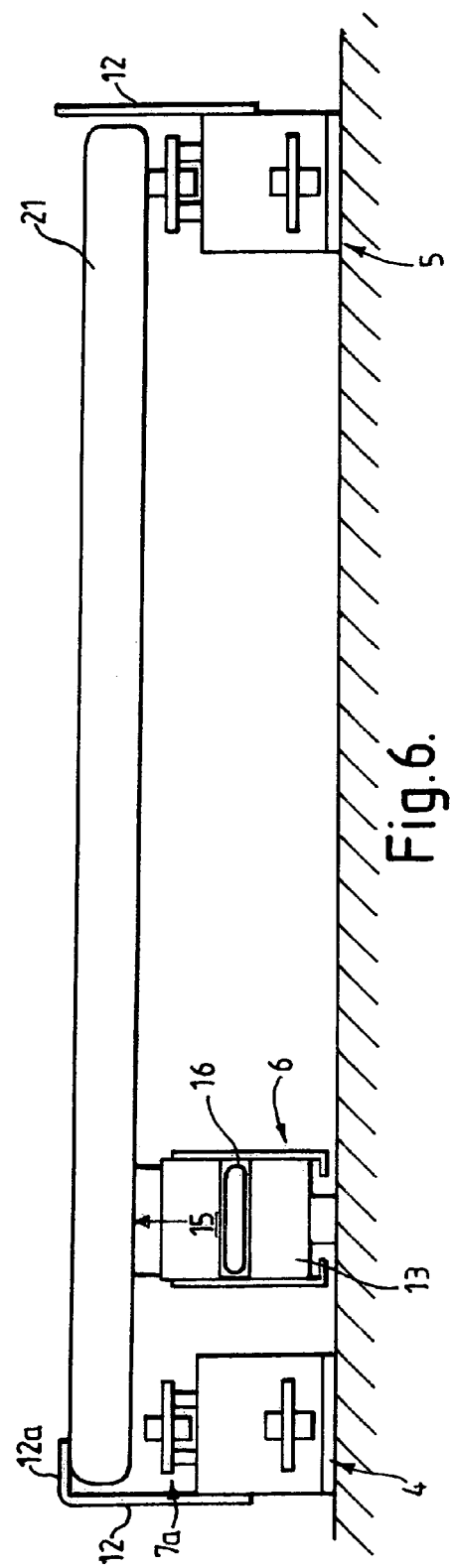
FIG. 6 is an end elevation of a modified form of conveyor system.

FIG. 6 shows a conveyor which is a modified version of the conveyor 2 described above. Accordingly, like reference numerals will be used for like parts. In fact, the only difference between this conveyor and that described earlier is that the vertical side guide 12 which is fixed to the chain rail housing 10 of the chain rail 4 is provided with an in-turned flange 12a.

The conveyor of FIG. 6 operates in exactly the same way as that described above with reference to FIGS. 1 to 5 in the manner in which pallets 21 are loaded and unloaded. After loading, however, actuation of the airbag rail 6 by inflating the airbag 16 is effective to lift the pallets 21 against the underneath side of the flange 12a, thereby clamping the pallets between the layer 19 of the lift beam 15 and the underneath surface of the flange. Consequently, if the pallets 21 and their supported loads are light, there is a substantially increased resistance to movement of the pallets when the trailer 1 moves suddenly, for example during hard braking, rapid acceleration or travelling over a particularly bumpy road.

It will be apparent that modifications could be made to the conveyor arrangements described above. In particular, where the pallets have a width which is considerably less than the width of the trailer 1, for example where standard pallets of dimensions 1×2 metre or 600×900 mm are used, two conveyors 2 could be placed side by side on the floor of the trailer 1. Moreover, where the height of the trailer 1 is substantially greater than that of the pallets 21 and their loads, an additional conveyor or conveyors could be provided part way up the trailer walls. For example, the trailer 1 could be provided with two conveyors 2 on its floor, and a further pair of conveyors approximately halfway up its side walls. Alternatively, three conveyors could be positioned side-by-side on the floor of the trailer 1.

It will be apparent that each of the conveyors described above does not require an air supply to the airbag rail 6 during loading or unloading of pallets, thereby obviating the need for the trailer 1 to be connected to its tractor unit or to a separate air supply during loading or unloading operations.

Another advantage of each of the conveyors described above with reference to FIGS. 1 to 6 is that the high friction layer 19 provided on the top of the lift beam 15 provides increased resistance to pallet movement during trailer braking, acceleration or travel over bumpy roads. This resistance to pallet movement is further increased by the provision of the flange 12a of the embodiment of FIG. 6.

What is claimed is:

1. A conveyor system for loading pallets into and out of a vehicle, the system comprising an accumulating conveyor and a single airbag rail, the accumulating conveyor being constituted by a pair of chain rails for supporting and conveying pallets into and out of a vehicle, the airbag rail being positioned between the chain rails and adjacent to one of the chain rails, wherein the airbag rail is constituted by a base beam, a lift beam and an airbag positioned between the two beams, the arrangement being such that, with the chain rails and the base beam fixed to the floor of a vehicle, the airbag can be inflated to raise the lift beam so as to lift an edge portion of a pallet supported by the two chain rails out of contact with said one chain rail.

2. A system as claimed in claim 1, wherein each chain rail comprises a chain rail housing and an endless conveyor chain, the housing defining an upper surface which supports a working run of the conveyor chain, the interior of the housing surrounding a return run of the conveyor chain.

3. A system as claimed in claim 2, wherein each conveyor chain has a plurality of links, each of which supports a freely-rotatable roller.

4. A system as claimed in claim 3, wherein the links of the conveyor chains are provided with wear strips for contact with the upper surface of the associated chain rail housing.

5. A system as claimed in claim 2, wherein each chain rail housing and the base beam are provided with means for fixing to a vehicle floor.

6. A system as claimed in claim 2, wherein each chain rail housing is provided with an upwardly-projecting flange at that side thereof remote from the other chain rail housing.

7. A system as claimed in claim 6, wherein the upwardly-projecting flange of the housing of said one chain rail is provided with an inwardly-extending lip at the upper end thereof.

8. A system as claimed in claim 1, wherein a layer of high friction material is provided on the upper surface of the lift beam.

* * * * *